May 12, 1959 B. J. SMITH 2,886,364
CONVERTIBLE TOP HEADER LOCK ASSEMBLY
Filed Sept. 15, 1954 3 Sheets-Sheet 1

INVENTOR
Ben J. Smith
BY
Paul Fitzpatrick
ATTORNEY

May 12, 1959 B. J. SMITH 2,886,364
CONVERTIBLE TOP HEADER LOCK ASSEMBLY
Filed Sept. 15, 1954 3 Sheets-Sheet 2

INVENTOR
Ben J. Smith
BY Paul Fitzpatrick
ATTORNEY

May 12, 1959 B. J. SMITH 2,886,364
CONVERTIBLE TOP HEADER LOCK ASSEMBLY
Filed Sept. 15, 1954 3 Sheets-Sheet 3

INVENTOR
Ben J. Smith
BY Paul Fitzpatrick
ATTORNEY

United States Patent Office 2,886,364
Patented May 12, 1959

2,886,364

CONVERTIBLE TOP HEADER LOCK ASSEMBLY

Ben J. Smith, Detroit, Mich., assignor to General Motors Corporation, Detroit, Mich., a corporation of Delaware Application September 15, 1954, Serial No. 456,281

3 Claims. (Cl. 292—113)

This invention relates to a locking mechanism for an automobile convertible top header and more particularly to such a locking mechanism which automatically brings the convertible top header into partial engagement with the windshield header when the top is raised so that the top header can be easily locked in place.

The locking mechanism of this invention is manually operable to release the convertible top header from locking engagement with the windshield header when it is desired to lower the top. After the top header is released from the windshield header, manual operation ceases and the locking mechanism becomes automatically operable to bring the convertible top header into partial engagement with the windshield header when the top is thereafter raised so that the top header can be easily locked in place.

An object of this invention is to provide an automobile convertible top header with a locking mechanism which materially reduces the effort required of the operator of the automobile in raising and lowering the top. Another object of this invention is to provide an automobile convertible top header with a locking mechanism which is manually operable to release the convertible top header from locking engagement with the windshield header to lower the top and automatically operable to place the locking mechanism in a safety position after release of the top has been effected and manual operation has ceased. A further object of this invention is to provide an automobile convertible top header with a locking mechanism which is manually operable to release the top header from locking engagement with the windshield header to lower the top and automatically operable to place the locking mechanism in a safety position after release of the top has been effected and manual operation has ceased so that when the top is raised the locking mechanism will automatically bring the convertible top header into partial engagement with the windshield header when the top is thereafter raised so that the top header can be easily locked in place.

These and other objects of this invention will be readily apparent from the following specification and drawings in which:

Figure 3 is an enlarged view of a portion of Figure 2 showing the latching mechanism of the invention;

Figure 1:
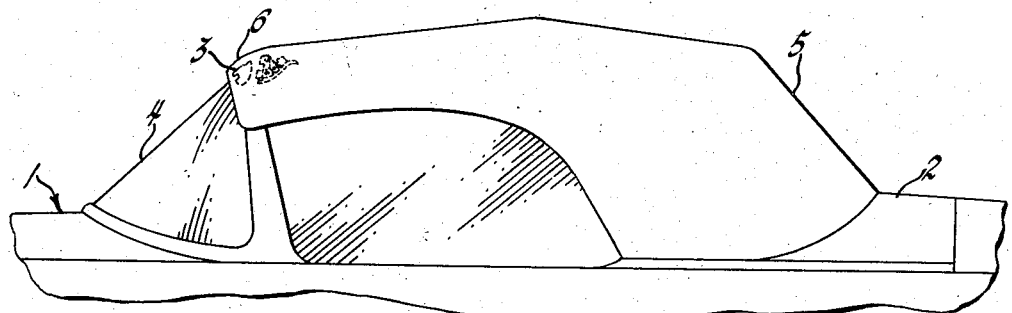
Figure 1 is a partial view of an automobile having a convertible top header embodying the locking mechanism of this invention.
Figure 2:
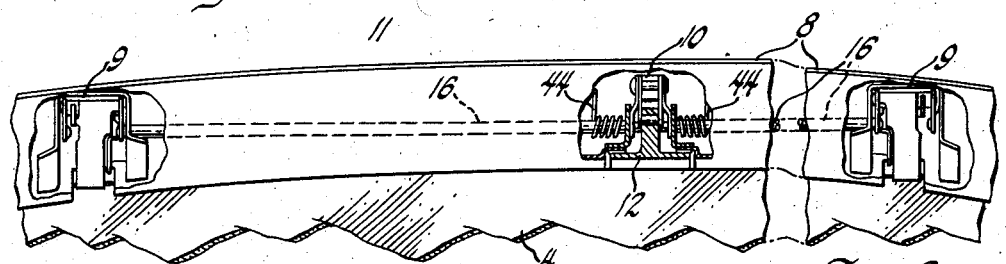
Figure 2 is a partial cut-away of the convertible top header taken from inside the automobile showing the elements of the locking mechanism.

Referring now to Figures 1 and 2 of the drawings, an automobile 1 has a body 2 provided with a windshield header 3 and a windshield 4. A convertible top 5 is mounted on body 2 by a supporting frame as is well known in the art. The forward portion 6 of the convertible top 5 supports a top header 8. The locking mechanism of this invention is mounted in the top header and locks the top header 8 to the windshield header 3 when the top is in raised position as shown in Figure 1.

The locking mechanism generally comprises manually operable means 10 mounted in the center of the top header and having a pull-down handle 12, and latching mechanisms 9 mounted at either end of the top header and operatively connected to manually operable means 10 by rotatable rods 16. The latching mechanisms 9 are the same and operate in unison. Therefore, only one of the latching mechanisms will be described.

Figure 4:
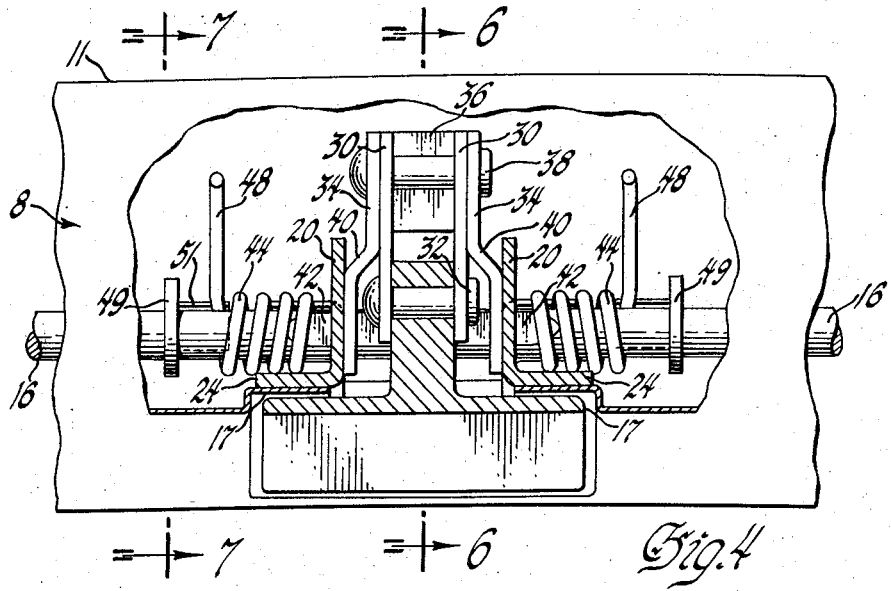
Figure 4 is an enlarged view of a portion of Figure 2 showing the manual operating means for the locking mechanism.
Figure 5:
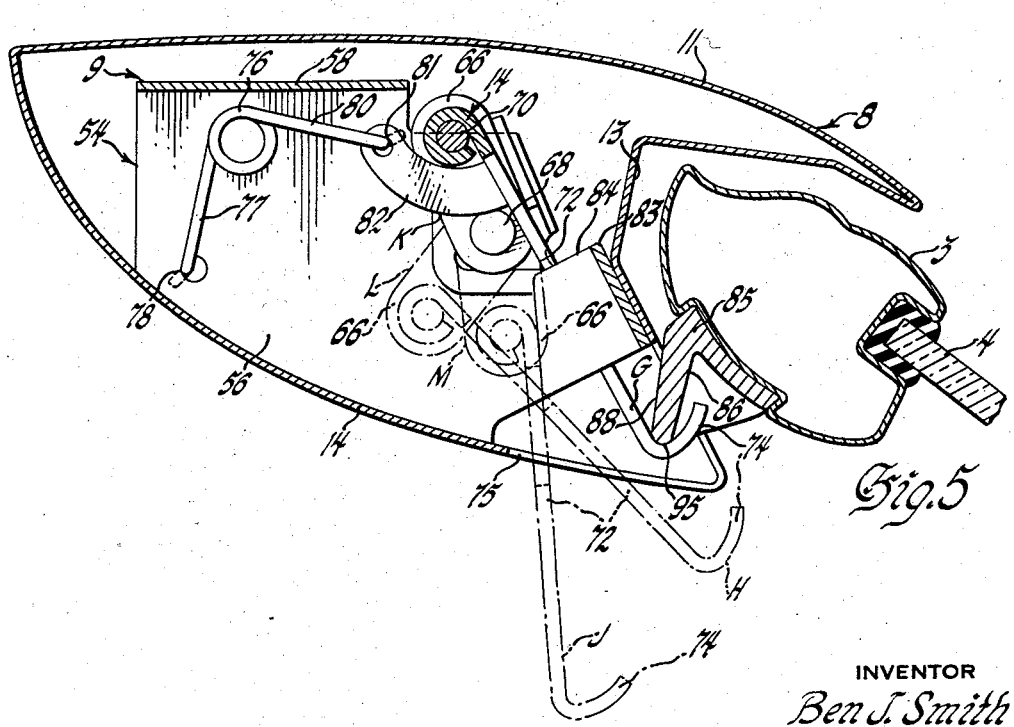
Figure 6:
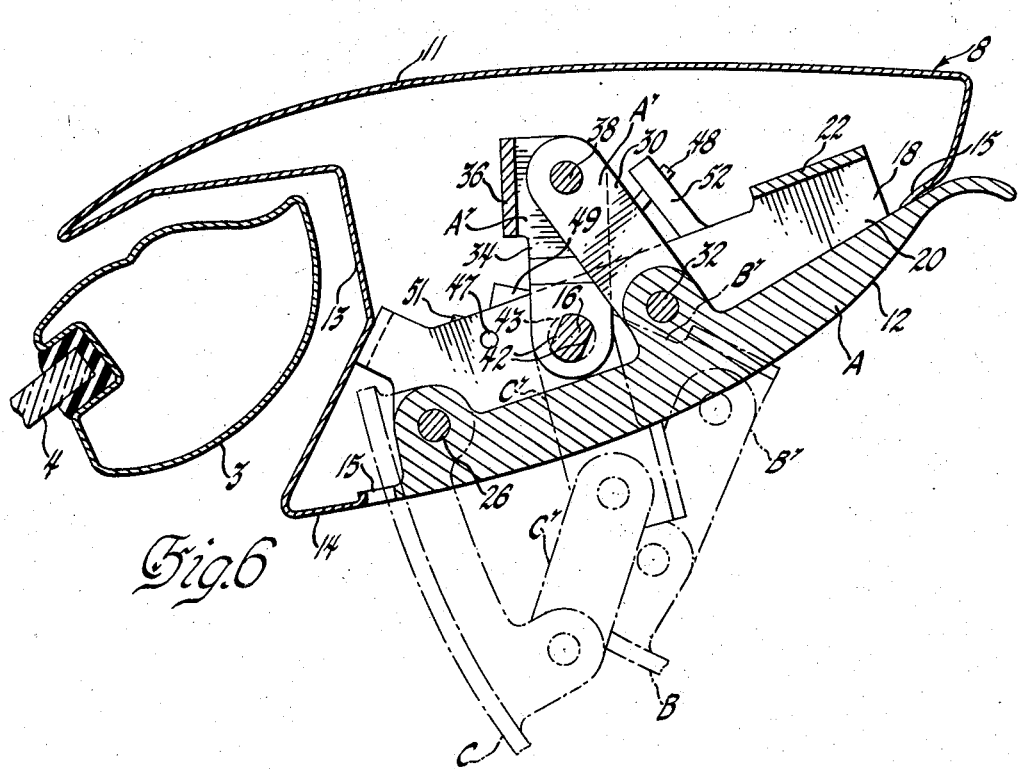
Figure 6 is a view taken on the plane indicated by line 6—6 of Figure 4.
Figure 7:
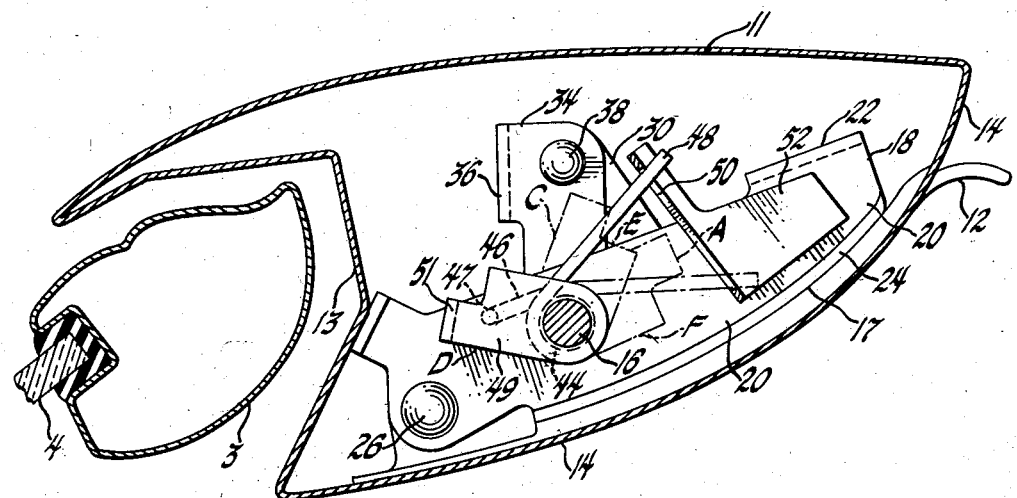
Figure 7 is a view on the plane indicated by line 7—7 of Figure 4.

Referring now to Figures 4, 6, and 7 of the drawings, the top header 8 has an upper surface 11, an inwardly extending portion 13 fitting over the windshield header 3, and a lower surface 14 provided with an opening 15. The lower surface 14 of the top header is offset inwardly at 17 around opening 15 in order that handle 12 will be flush with surface 14 in its locked position as shown in Figure 7. A frame 18 has spaced side members 20 and a web 22 connecting the side members at the rearward portion of the frame. Side members 20 have flanges 24 which are secured to the offset portion 17 of the lower surface 14 of the top header to mount frame 18 in the center of the top header around opening 15. A pin 26 is journaled in the side members 20 of frame 18 and handle 12 is rotatably mounted on this pin. A pair of links 30 are pivotally secured to handle 12 by a pin 32. Another pair of links 34 are offset at 40 and connected by a web 36. Links 34 are pivotally secured to links 30 by pin 38. Rotatable rods 16 have flattened end portions 42 which are jounaled in circular openings 43 in side members 20. The free ends of links 34 are provided with openings similar to the shape of end portions 42 of rods 16 and are fitted over the ends of the rods. Links 30 and 34 provide an operative connection between handle 12 and rotatable rods 16. Thus, manual movement of handle 12 about pin 26 is translated into rotation of rods 16, and rotation of rods 16 is likewise translated into movement of handle 12 about pin 26 to any of the positions shown in dotted lines in Figure 6, as will be hereinafter described.

A pair of torsion springs 44 are mounted on rods 16 to either side of side members 20 and have one end 46 secured to the side members at 47. The other ends 48 of these springs are slidably mounted in slots 50 provided in bracket members 52 secured to side members 20 (Figure 7). A pair of arms 49 (Figure 7) having laterally extending portions 51 are fixedly secured to rods 16. As rods 16 are rotated, portions 51 of these arms contact ends 48 of springs 44 and move these ends downwardly within slots 50 as will be hereinafter explained.

Figure 5:
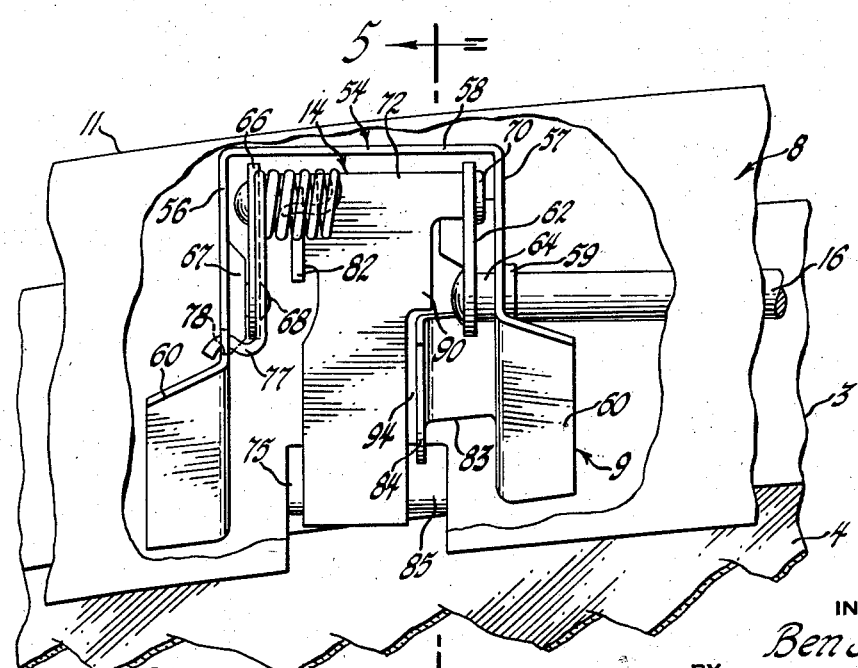
Figure 5 is a view taken on the plane indicated by line 5—5 of Figure 3.

Referring now to Figures 3 and 5 of the drawings, the latching mechanism generally designated as 9 will now be described. A hinge box 54 having side members 56 and 57 joined by a web 58 is secured to the lower surface 14 of header 8 by laterally extending flanges 60. A link 62 is fixed on the end 64 of rod 16 which is journaled at 59 in side member 57 of the hinge box. A similar link 66 is pivotally secured to an offset portion 67 of side member 56 of the hinge box by a pin 68. A pin 70 connects the free ends of links 62 and 66. A latching member 72 having a hooked end 74 is rotatably mounted on pin 70. The lower surface 14 of top header 8 has opening 75 for hooked end 74. A torsion coil spring or hairpin spring 76 has one end 77 connected through opening 78 to the side member 56 of the hinge box 54 and the other end 80 of this spring is connected through opening 81 to an arcuate arm 82 extending laterally from latching member 72. Side frame member 57 of the hinge box has a laterally extending portion 83 bent at right angles to form a stop 84. The windshield header 3 is provided with an abutment 85 which is undercut at 86 to provide an engagement surface for hooked end 74 of latching member 72.

The operation of the mechanism will now be described. Referring now to Figure 6 of the drawings, handle 12 has three positions A, B, and C corresponding to locked position, free position, and fully open position, respectively. Links 30 and 34 have positions A', B', and C' corresponding to positions A, B, and C, respectively, of handle 12. Referring now to Figure 7 of the drawings, arms 49 fixedly secured to rods 16 have positions D, E, and F corresponding to positions A, B, and C, respectively, of handle 12. Laterally extending portions 51 of arms 49 contact the ends 48 of springs 44 in position E, free position, and wind up the springs as arms 49 move to position F, fully open position. Springs 44 do not exert any force on arms 49 in position E. Thus, as handle 12 is manually moved to position C, fully open position, arms 49 will be moved to position F by rotation of rods 16 and springs 44 will be wound up. When handle 12 is released by the operator thereof, springs 44 will return arms 49 to position E, free position, and will return handle 12 to position B, free position, by rotation of rods 16. Links 30 and 34 will similarly move to their fully open and free positions C' and B', respectively.

In Figure 5 of the drawings, latching member 72 has positions G, H, and J corresponding to positions A, B, and C, respectively, of handle 12, and links 62 and 66 have positions K, L, and M corresponding to the same positions, respectively, of handle 12.

In the locked positions of links 62 and 66 and latching member 72, K and G, respectively, spring 76 exerts no force on arcuate arm 82. However, as links 62 and 66 and latching member 72 move to their free positions, L and H, respectively, arm 82 will move end 80 of spring 76 toward end 77 and compress the spring. As arm 82 moves from a position where opening 81 is the least distance from opening 78 to a position beyond this least distance, spring 76 will expand and exert a force tending to move links 62 and 66 and latching member 72 to their free positions L and H, respectively, and will maintain these members in these positions.

Likewise spring 76 will resist any movement of links 62 and 66 and latching member 72 from their free positions to their locked positions. If links 62 and 66 and latching member 72 are moved from their free positions to their fully open positions M and J, respectively, spring 76 will be stretched and will exert a force tending to return these members to their free positions. Thus, spring 76 will resist movement of links 62 and 66 and latching member 72 from their locked positions to their free positions and will cooperate with spring 44 in resisting movement of these members from their free positions to their fully open positions. Spring 76 exerts no force only in the locked positions of links 62 and 66 and latch member 72 and the free positions of these members.

Assuming now that the top is in raised position with the top header locked to the windshield header and it is desired to lower the top: Handle 12 is moved from its locked position A through its free position B to its fully open position C. Links 30 and 34 will also move from position A' through position B' to position C' and will rotate rods 16. As rods 16 rotate, portions 51 of arms 49 will contact the ends 48 of springs 44 at position E and will wind up the springs as arms 49 move to position F, as shown in Figure 7. Links 62 and 66 will likewise move from position K through position L to position M and will move latching member 72 from position G through position H to position J. In positions H and J, portion 90 of latching member 72 will contact stop 84, Figure 5. Latching member 72 is cut away at 94 (Figure 3) so that it will clear stop 84 as it moves to locked position from free and fully open positions. Latching member 72 is now removed from engagement with abutment 85 and the top can then be lowered.

As soon as the top header has cleared the windshield header, handle 12 is released and the end portions 48 of springs 44 will act on arms 49 to return the arms to position E. This will rotate rods 16 in a reverse direction and links 30 and 34 will move to position B', and handle 12 will be moved to position B. The reverse rotation of rods 16 will also move latching member 72 from position J to position H and links 62 and 66 will move from position M to position L. Position H of latching member 72 can be called the safety position of this member. Spring 76 will aid springs 44 in moving latching member 72 and links 62 and 66 from positions J and M, respectively, to positions H and L, respectively, as hereinbefore explained.

Assuming now that the top is lowered and the operator of the vehicle desires to raise the top: As the top header approaches the windshield header, the hooked end 74 of latching member 72, in safety position H, will strike the outer surface 88 of abutment 85 and will be moved toward fully open position, against the action of spring 76. As soon as the hooked end 74 has cleared the end portion 95 of abutment 84, spring 76 will return the latching member 72 to position H, safety position, and will maintain the latching member in this position as hereinbefore described. In position H, hooked end 74 may or may not engage the undercut portion 86 of abutment 85 depending on how close the convertible top header is to the windshield header. However, regardless of how close the convertible top header is to the windshield header, the top cannot be lowered or moved away from the windshield header without the hooked end fully engaging undercut portion 86 of abutment 85. Thus, the locking mechanism is automatically operable to effect a partial engagement of the convertible top header with the windshield header.

In order to securely lock the top header to the windshield header, handle 12 is moved from position B to position A, moving links 30 and 34 from position B' to position A' and rotating rods 16. As rods 16 rotate, links 62 and 66 move from position L to position K and latching member 72 moves from position H to position G. Spring 76 will be compressed as the latching member moves between positions H and G, as hereinbefore explained, and once opening 81 has moved beyond its position of least distance from opening 78, spring 76 will expand and exert a force tending to move latching member 72 and links 62 and 66 to their locked positions G and K, respectively.

Referring now to Figure 5 of the drawings, in the locked position of the latching mechanism pin 70 will be over center with respect to a plane through end portion 95 of abutment 84 and rod 16 and pin 68. This over center effect holds the latching member 72 in its locked position, springs 76 and 44 exerting no force as hereinbefore explained.

While a specific embodiment of this invention has been shown and described, various changes and modifications may be made without departing from the scope and spirit of the invention.

I claim:
1. Locking mechanism for an automobile convertible top header movable into and out of engagement with a windshield header comprising, latch support means ro- tatably mounted in said top header, latch means swingably mounted on said support means for movement to locked position and at least one other position upon rotation of said support means, torsion coil spring means having one terminal portion pivotally supported by said top header and the other terminal portion pivotally supported on said latch means, said arrangement causing said torsion coil spring means to be placed under load upon movement of said latch means between said locked position and said other position to exert a force biasing said latch means toward said locked position when said other terminal portion is on one side of a line through said one terminal portion and the axis of rotation of said latch support means and to exert a force biasing said latch means toward said other position when said other terminal portion passes to the other side of said line, said latch means being retained in said other position by said torsion coil spring means under no load condition, keeper means supported on said windshield header and engageable by said latch means in locked position to effect engagement of said top header with said windshield header, and operating means for rotating said support means to move said latch means between said locked and said other positions, the axis of rotation of said latch means being located toward the front edge of said top header sidewardly of a line through the point of engagement of said latch means with said keeper means and through the axis of rotation of said support means in said locked position to retain said latch means in said position under no load conditions of said torsion coil spring means.

2. Locking mechanism for an automobile convertible top header movable into and out of engagement with a windshield header comprising, latch support means rotatably mounted in said top header, latch means swingably mounted on said support means for movement to locked, unlocked, and intermediate safety positions upon rotation of said support means, torsion coil spring means having one terminal portion pivotally supported by said top header and the other terminal portion pivotally supported on said latch means, said arrangement causing said torsion coil spring means to be placed under load upon movement of said latch means between said locked position and said intermediate position to exert a force biasing said latch means toward said locked position when said other terminal portion is on one side of a line through said one terminal portion and the axis of rotation of said latch support means and to exert a force biasing said latch means away from said locked position toward said intermediate position when said other terminal portion passes to the other side of said line, said latch means being retained in said intermediate position by said torsion coil spring means under no load condition, keeper means supported on said windshield header and engageable by said latch means, said torsion coil spring means being placed under load upon movement of said latch means toward said unlocked position to return said latch means to said intermediate position, and operating means for rotating said support means to move said latch means between said intermediate and locked positions, the axis of rotation of said latch means in said locked position being located toward the front edge of said top header sidewardly of a line through the axis of rotation of said support means and through the point of engagement of said latch means with said keeper means to retain said latch means in said locked position and effect engagement of said top header with said windshield header.

3. Locking mechanism for an automobile convertible for connecting a top header with a windshield header comprising, latch support means rotatably mounted in one of said headers, said latch support means including a crank arm having a crank pin, latch means swingably mounted about said crank pin on said crank arm for movement to locked, unlocked and intermediate safety positions upon rotation of said support means, a torsion coil spring having two free ends, one of said free ends being pivotally mounted on the header carrying the latch support means, the other of said free ends being pivotally connected to said latch means at a point spaced from the swingable mounting of the latch means about said crank pin and angularly displaced from the direction in which the latch means extends from said crank pin, said torsion coil spring being arranged to move bodily about its header pivot when the latch means is moved from the locked position to the intermediate and to the unlocked position, the above-said arrangement of said torsion coil spring causing the same to exert a biasing force toward the locked position when the other of said free ends is on one side of a line through the pivot of said one free end and the axis of rotation of said latch support means until the pivot of the other of said free ends is in alignment with said line, the direction of said force changing toward the intermediate position after passing said line, said latch means being retained in the intermediate position by said spring under no-load condition, while further movement of the latch means beyond the intermediate position to the unlocked position also causes bias of the spring toward the intermediate position, and operating means for rotating said support means to move said latch means from said intermediate position to both said locked and unlocked position respectively.

References Cited in the file of this patent

UNITED STATES PATENTS

| | | |
|---|---|---|
| 1,481,216 | McMillion | Jan. 15, 1924 |
| 1,931,850 | Moore | Oct. 24, 1933 |
| 2,274,711 | Krause | Mar. 3, 1942 |
| 2,339,537 | Wise | Jan. 18, 1944 |
| 2,674,480 | Vigmostad | Apr. 6, 1954 |
| 2,709,621 | Votypka | May 31, 1955 |